| United States Patent Office | 3,287,241 |
|---|---|
| | Patented Nov. 22, 1966 |

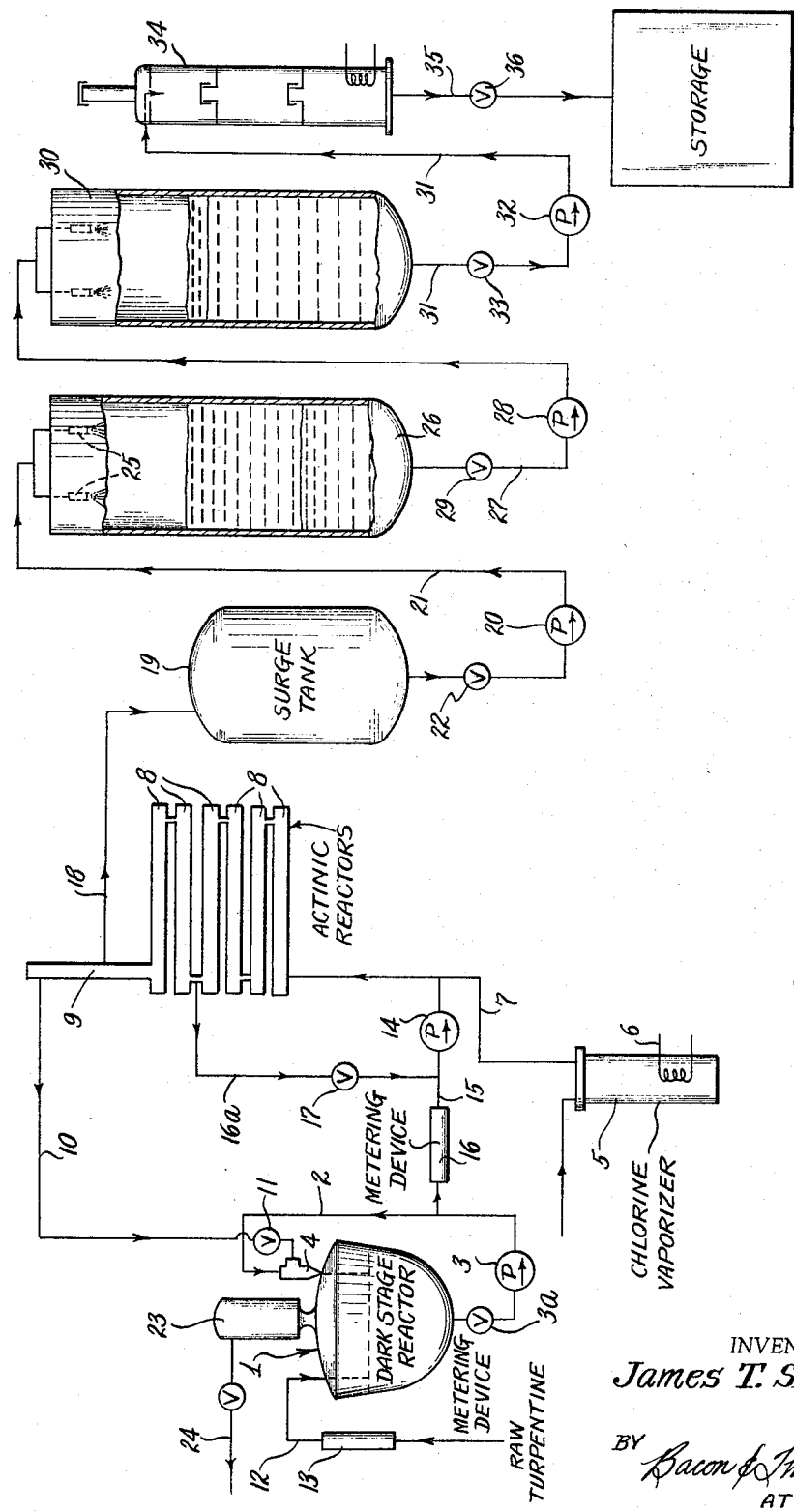

3,287,241
CHLORINATION OF TURPENTINE
James T. Smith, Mission, Tex., assignor to Mission Chemical Company, a corporation of Texas
Filed Nov. 21, 1962, Ser. No. 239,244
8 Claims. (Cl. 204—163)

The present invention relates to a process for producing a chlorinated terpene product and, more particularly, to a continuous process for producing such a product by the direct chlorination of turpentine.

It is well known that highly chlorinated terpenes provide very valuable insecticides because they are highly insecticidal while possessing a low order of toxicity when consumed by warm-blooded animals. It is also well known that turpentine is the most abundant and cheapest source of terpenes but its direct use for the production of a chlorinated terpene insecticide has been thwarted by the fact that α-pinene, the predominant constituent of turpentine, is resistant to chlorination with molecular chlorine. Accordingly, existing commercial processes for the production of insecticidal chlorinated terpenes have depended upon the initial conversion of α-pinene to a readily-chlorinated terpene, such as camphene or bornyl chloride, followed by chlorination of these products by batch. Understandably, such processes are time-consuming and expensive.

Accordingly, it is the primary object of the present invention to provide an efficient and economical process for the preparation of a chlorinated terpene insecticide by the direct chlorination of turpentine.

A further object of the invention is to provide such a process which, after its initiation, will be continuous in nature.

Other objects of the invention will be apparent from the following detailed description taken in conjunction with the drawing which diagrammatically illustrates apparatus which may be used for carrying out the present process.

It has been discovered that advantage can be taken of the minor amounts, usually 5–10%, of terpenes, such as β-pinene, dipentene and camphene, which are present in turpentine, to provide a process for the production of a highly chlorinated terpene insecticide by the direct chlorination of turpentine. These terpenes, unlike α-pinene, are spontaneously chlorinated by molecular chlorine, even in an opaque reactor, without the supplying of energy from an external source. The reaction is exothermic and since the chlorination is by substitution, HCl is evolved which isomerizes and hydrochlorinates α-pinene to bornyl chloride, which compound is also chlorinatable with the production of additional HCl to maintain the hydrochlorination of the α-pinene. The reaction temperature should be controlled at 70° C., or less, to prevent a runaway reaction or explosion and this is conveniently accomplished by the rate of addition of reaction gas.

While the above-described reaction is very economical and proceeds smoothly and efficiently, it will not yield a product which is chlorinated to the extent that it will be an effective insecticide. The effective chlorinated terpene insecticides contain from 60%–65% by weight of chlorine and a product of this chlorine content cannot be obtained by the dark-stage reaction described above. During the continuous operation of the process which will be described later, an equilibrium will be reached in the exothermic reaction at which the product will have a chlorine content of approximately 44% by weight which represents the substitution of two chlorine atoms into bornyl chloride after it has been formed by the reaction of the α-pinene and HCl in equimolecular proportions. The reaction can be closely followed by observing the specific gravity of the reaction mixture which increases progressively with the degree of chlorination. The starting turpentine will usually have a specific gravity of about 0.86 and this will have increased to about 1.27–1.30 when equilibrium is attained.

Upon achieving the degree of chlorination desired, a portion of the reaction mixture is withdrawn with turpentine being added to replace it at a rate which will effect the maintenance of the desired specific gravity and from this point, the process becomes continuous in nature. The material withdrawn is further chlorinated to the extent indicated earlier for an effective insecticide by flowing it through a confined space in contact with gaseous chlorine while subjecting it to actinic radiation and heat supplied by the source of this radiation. The temperature of the reaction mixture during actinic chlorination is maintained between about 60° C.–90° C., which readily can be accomplished by heat exchange with cooling liquids. Again the reaction may be easily followed by observing the specific gravity of the reaction mixture and chlorination is terminated when the specific gravity reaches a value of 1.52 to 1.56 which represents a chlorine content of the product of from 62.5% to 66% by weight.

The process of the invention outlined above will now be described in greater detail with reference to the drawing which, as indicated earlier, shows diagrammatically apparatus suitable for carrying out the process in its entirety. In order to initiate the process, the dark-stage reactor 1 is charged with turpentine which is preferably a redistilled product containing about 95% α-pinene and about 5% of a mixture composed principally of β-pinene and dipentene. A portion of the turpentine is continually recycled through a conduit 2 by means of a pump 3 under the control of a valve 3a and chlorine gas is mixed with turpentine through a diffusion valve 4 located in the conduit 2. The chlorine gas may be supplied to the diffusion valve by a vaporizer 5 in which liquid chlorine is vaporized by means of heat from a heating element 6, the chlorine gas passing through a conduit 7, a plurality of actinic reactors 8, inactive at this time, a vapor trap 9, and a conduit 10.

The chlorine gas, as stated earlier, reacts exothermically with the minor amounts of such terpenes as β-pinene and dipentene which are present to partially chlorinate them and produce HCl gas. A sufficient amount of chlorine gas is admitted slowly, at a low pressure of about 0.5–0.8 kg./cm.$^2$, through the diffusion valve to supply at least two moles of $Cl_2$ for each mole of chlorinatable terpene which causes the substitution of two chlorine atoms into each terpene molecule chlorinated and forms two moles of HCl for each mole of terpene which is chlorinated. The HCl released immediately isomerizes and hydrochlorinates α-pinene to bornyl chloride and additional chlorine is fed into the system at the same low pressure to chlorinate the bornyl chloride and release additional HCl to maintain the hydrochlorination of the α-pinene. Chlorine is continuously fed into the system at low pressure, preferably until the specific gravity approaches 1.27–1.30, which represents the introduction, on the average, of three atoms of chlorine into each terpene molecule. It is possible to place the process in continuous operation in a manner which will be described in detail hereinafter, when the specific gravity of the reaction mixture reaches a figure as low as 1.15 or after it has risen somewhat above 1.30, but it has been found that during continuous operation, it tends to return to equilibrium at 1.27–1.30.

The reaction, as stated, is strongly exothermic, and it is capable of developing very high temperatures, sufficient even to cause explosion and fire if not carefully controlled. As a practical matter, the temperature should never be allowed to rise about 140° C. since extensive polymerization and pyrolysis will occur. A temperature range of 50° C. to 90° C. is permissible in the first or exothermic stage of the present process, but it is preferred that the temperature be maintained at about 70° C. It has been found that the most suitable way to control the temperature of the reaction mixture is by regulating the rate of addition of chlorine gas which may be accomplished by means of the adjustment of a valve 11 in the conduit 10.

When the specific gravity of the reaction mixture of the first or dark stage reaches the desired specific gravity, raw turpentine can be continuously fed into the reactor 1 and continuously withdrawn therefrom at a rate which, if it has not already been attained, will establish and maintain the state of equilibrium mentioned above, thus providing for the second or actinic chlorination stage, a continuous supply of an intermediate product which has been partially chlorinated without supplying energy from an external source. The raw turpentine may be fed in through a conduit 12 containing a metering device 13, which may be a conventional rotameter, and the reaction mixture is withdrawn by means of a pump 14 through a conduit 15, the amount withdrawn being regulated by a metering device 16 which may be similar to the metering device 13.

It will be seen that the conduit 15 communicates with the conduit 7 and thus the intermediate, partially chlorinated product withdrawn from reactor 1 is passed in series in contact with chlorine gas through the plurity of actinic reactors 8. These reactors will be of conventional construction and may comprise a source of actinic radiation situated within a quartz tube, this tube being concentric with a passageway for conducting the mixture of partially chlorinated product and chlorine gas so that they are subjected to actinic radiation and heat supplied by the source of this radiation. The conducting passageway will itself be jacketed so that the reaction mixture will be in heat exchange relationship with a cooling medium for a purpose which will be brought out hereinafter.

Commercially available reactors can readily be selected and a sufficient number of them employed to provide an intensity and duration of actinic radiation to effect chlorination of the material passing through the actinic reactors to the extent desired in the final product, which will be from 62.5% to 66% of chlorine by weight, preferably about 64% by weight. This can again be gauged by following the increase in specific gravity of the product, and chlorination to the desired extent may be obtained by recycling the reaction mixture through a conduit 16a provided with a valve 17. It has been found that after an initial start-up period, actinic exposure can be decreased while maintaining the required rate of reaction and this may conveniently be accomplished by deactivation of one or more of the actinic reactors. The fully chlorinated product passes from the actinic reactors through a conduit 18, and is collected in a surge tank 19 from which it is withdrawn by a pump 20 disposed in a conduit 21 provided with a valve 22 for regulating the rate of flow, the product then being purified in a manner which will be described later.

When partially chlorinated intermediate product is fed into the actinic cycle, chlorine gas feed pressure can be increased to 1–1.5 kg./cm.$^2$. It has been found that it is necessary to maintain an excess of 3%–10% over the stoichiometric quantity of chlorine in the actinic stage reaction to obtain the required degree of chlorination.

The excess chlorine and HCl gas liberated by the chlorination in the actinic stage are collected in the vapor trap 9 and passed into the dark-stage reactor 1 where the excess chlorine is largely absorbed in the dark-stage chlorination. The by-product HCl from the actinic stage chlorination supplements that formed in the dark-stage chlorination to convert the α-pinene of the incoming raw turpentine to bornyl chloride but there will always be, after the process is operating continuously, an excess of HCl. This arises from the reaction vessel 1, passes through an entrainment tower 23 and is fed by a conduit 24 into a scrubbing tower (not shown) for collection.

The temperature of the reaction in the actinic chlorination stage is maintained between 60° C. and 100° C. There is sufficient heat developed by the sources of actinic radiation in the reactors to heat the reaction mixture well above the maximum temperature permissible and, accordingly, a convenient way to regulate the temperature within the disclosed limits is by the circulation of cooling liquids through the jackets of the actinic reactors.

It has been found that when a specific gravity of 1.54 is reached, which represents about 61% chlorination of the product, the various feed and withdrawal rates can be increased and the operation balanced to maintain constant volume in the reactor 1 and surge tank 19.

The fully chlorinated but impure product withdrawn from surge tank 19 through conduit 21 is sprayed from nozzles 25 into a tank 26 in which is maintained a pool of an aqueous solution of an alkaline material such as sodium carbonate. The droplets of high specific gravity product fall through the aqueous solution and this removes the hydrogen chloride and free chlorine dissolved therein.

The neutralized product which collects at the bottom of tank 26 is withdrawn through a conduit 27 by a pump 28, the flow being controlled by a valve 29, and fed into a settling tank 30, where it separates from the entrained aqueous solution by gravity. The separated product which has picked up 3%–5% of moisture is then pumped from the bottom of settling tank 30 through a conduit 31 by a pump 32 under the control of a valve 33 and fed into the top of a dehydration tower 34 where the last traces of moisture are removed by heat.

The purified, highly chlorinated product is then removed for storage through a conduit 35 under the control of a valve 36. It is advantageous to stabilize the final product by removing the last traces of chlorine which may remain. This is conveniently accomplished by adding a small percentage (1%–5%) of a chlorine acceptor, such as raw turpentine, dipentene, camphene, or the like.

The following example is given to further illustrate the invention but it is not intended to limit its scope in any manner.

*Example*

Using the apparatus of the drawing, 400 liters (344 kg.) of redistilled turpentine (specific gravity—0.86) containing approximately 95% α-pinene and 5% of a mixture of β-pinene and dipentene were introduced into dark-stage reactor 1 and recycled through the conduit 2 and the diffusion valve 4. Approximately 18 kg. of chlorine gas were slowly introduced into the system at the diffusion valve 4 at a low pressure of 0.5–0.8 kg./cm.$^2$ and mixed with the circulating stream of turpentine to thereby chlorinate the dipentene and β-pinene while simultaneously releasing HCl. This HCl reacted with the α-pinene to form bornylchloride.

Additional chlorine was then fed into the system at the same low pressure to chlorinate the bornylchloride and release additional HCl which in turn effected a further conversion of α-pinene to bornylchloride. The chlorine was continuously fed into the stream of circulating reaction mixture until the specific gravity of the reaction mixture increased to 1.27, which represented the obtaining of a product containing about 44% chlorine by weight. A total of 425 kg. of chlorine was required to chlorinate the 344 kg. of turpentine to the required specific gravity. The temperature of the reaction mixture in the dark-stage reactor was maintained at about 70° C.

When the specific gravity of the reaction mixture reached 1.27, the reaction mixture was fed into the actinic reactors 8 at a rate of 25 liters per hour and raw turpentine was fed through the metering device 13 into the dark-stage reactor at a rate of 20 liters per hour. As the intermediate product was introduced into the actinic reactors, the chlorine feed-pressure was increased to 1 kg./cm.² The intermediate feed was recycled through the actinic reactors with fresh chlorine until the specific gravity increased to 1.54.

When a specific gravity of 1.54 was reached, the operation was balanced to maintain a constant volume in the dark-stage reactor 1 and the surge tank 19. The continuous feed rate of the raw turpentine was adjusted to about 50 liters per hour, while the feed rate of the intermediate product having a specific gravity of 1.27 was adjusted to about 60 liters per hour. The chlorine feed was about 133.4 kg./hour which included a 3% excess.

The chlorinated product having a specific gravity of 1.54 was fed from the surge tank into the desorption system at a constant rate of about 75 liters per hour where it was purified in the manner described above. The yield was approximately 107.5 kg. of product per hour and 66.5 kg. of by-product HCl per hour. The temperature of the reaction mixture during actinic chlorination was maintained within the range of 75–90° C.

Thus it is seen that by the method described above, there has been obtained a highly chlorinated terpene product by the direct chlorination raw turpentine. The overall process is essentially continuous in nature and is highly economical as compared with the prior art methods for obtaining chlorinated terpenes of high chlorine content. The purified product obtained by the process of the invention is an excellent insecticide, possessing very high insect-destroying properties and, relatively speaking, a very low order of toxicity to warm-blooded animals.

I claim:

1. A process of preparing a chlorinated terpene insecticidal composition by the direct chlorination of turpentine containing a major proportion of α-pinene and a minor proportion of at least one spontaneously chlorinatable terpene, comprising feeding chlorine gas into a body of said turpentine to obtain a body of partially chlorinated product having a specific gravity of at least about 1.15; continuously withdrawing a portion of said partially chlorinated product while continuing the feeding of chlorine gas into said body of partially chlorinated product and replacing it with turpentine, the rates of withdrawal and replacement being such that there is established an equilibrium at which the specific gravity of the reaction mixture is between about 1.27–1.30; flowing said withdrawn partially chlorinated product in contact with an excess of chlorine gas while subjecting it to heat and actinic radiation to further chlorinte said product to produce a chlorinated terpene composition having a chlorine content between about 62.5% to about 66% by weight; separating said excess chlorine and HCl formed during actinic chlorination from said composition; and feeding said separated chlorine and HCl into said body of partially chlorinated product.

2. The process of claim 1 in which the chlorine gas is fed into a recycling portion of said body of partially chlorinated product.

3. The process of claim 1 in which the temperature of the reaction mixture in the first stage chlorination is maintained between about 50° C. and 90° C. and the temperature of the reaction mixture during actinic chlorination is maintained between about 60° C. and 100° C.

4. The process of claim 1 in which the composition produced by actinic chlorination is collected as a body of liquid from which a portion is continuously withdrawn for purification and the conditions of operation are balanced so that the volumes of said body of partially chlorinated product and body of the composition produced by actinic chlorination remain substatnially constant.

5. A process of preparing a chlorinated terpene insecticidal composition by the direct chlorination of turpentine containing a major proportion of α-pinene and a minor proportion of at least one spontaneously chloriatable terpene, comprising continuously feeding turpentine into a body of a reaction mixture comprising partially chlorinated bornyl chloride, chlorine and hydrogen chloride, said reaction mixture having a specific gravity between about 1.27–1.30; continuously withdrawing a portion of said reaction mixture, the feed rate of said turpentine and the withdrawal rate of said reaction mixture being such that the specific gravity of said reaction mixture is not substantially affected; flowing said withdrawn reaction mixture in contact with an excess of chlorine gas while subjecting it to heat and actinic radiation to produce a chlorinated terpene product having a chlorine content of from about 62.5% to about 66% by weight; separating said excess chlorine and HCl formed during actinic chlorination from said chlorinated terpene product; and feeding said separated chlorine and HCl into said body of reaction mixture.

6. The process of claim 5 in which the temperature of said body of reaction mixture is maintained between about 50° C. and 90° C. and the temperature of the reaction mixture during actinic chlorination is maintained between about 60° C. and 100° C.

7. The process of claim 5 in which said chlorinated terpene product is collected as a body of liquid from which a portion is continuously withdrawn for purification and the conditions of operation are balanced so that the volumes of said body of reaction mixture and said body of chlorinated terpene product remain substantially constant.

8. The process of claim 5 in which said separated excess chlorine and HCl formed during actinic chlorination are fed into a recycling portion of said body of a reaction mixture comprising partially chlorinated bornyl chloride, chlorine and hydrogen chloride.

References Cited by the Examiner

UNITED STATES PATENTS 3,196,099   7/1965   Shorr _____ 204—163

FOREIGN PATENTS 52,338   7/1954   India.

JOHN H. MACK, *Primary Examiner.*

HOWARD S. WILLIAMS, *Examiner.*